United States Patent

Mikami

[11] Patent Number: 6,102,991
[45] Date of Patent: Aug. 15, 2000

[54] EXHAUST GAS CLEANER AND EXHAUST GAS CLEANER ASSEMBLY USING A PLURALITY OF EXHAUST GAS CLEANERS

[76] Inventor: Tatuya Mikami, 302, Crest-Suehiro, 2-13-20, Suehiro, Ichikawa-shi, Chiba-ken, Japan

[21] Appl. No.: 09/268,467

[22] Filed: Mar. 16, 1999

[30] Foreign Application Priority Data

Mar. 17, 1998  [JP]  Japan .................................. 10-108405

[51] Int. Cl.$^7$ ................................................ B01D 46/22
[52] U.S. Cl. .............................. 96/231; 55/290; 55/354; 96/288
[58] Field of Search ............................ 95/281, 282, 212; 96/231, 233, 269, 276, 287, 288, 289, 283, 286; 55/354, 289, 295, 296, 290

[56] References Cited

U.S. PATENT DOCUMENTS

| | | | |
|---|---|---|---|
| 1,814,855 | 7/1931 | Robbins et al. | 96/288 |
| 1,949,540 | 3/1934 | Hammond | 96/231 |
| 2,070,872 | 2/1937 | Strindberg | 96/288 |
| 2,220,347 | 11/1940 | Nutting | 96/231 |
| 2,271,401 | 1/1942 | Sainty | 96/286 |
| 2,815,826 | 12/1957 | Young | 96/231 |
| 2,864,598 | 12/1958 | Arborgh | 96/288 |
| 3,328,941 | 7/1967 | Green | 96/231 |
| 3,487,620 | 1/1970 | Klein et al. | 55/354 |
| 3,717,978 | 2/1973 | Osborne, Jr. | 55/289 |
| 3,789,587 | 2/1974 | Moorefield, II | 55/354 |

*Primary Examiner*—Duane S. Smith
*Attorney, Agent, or Firm*—Christensen O'Connor Johnson & Kindness PLLC

[57] ABSTRACT

An exhaust gas cleaner includes an exhaust gas introducing member having an exhaust gas inlet port into which an exhaust gas is introduced and an exhaust gas outlet port through which the exhaust gas is discharged, an endless filter member provided across the exhaust gas outlet port, a filter member driving device which circulates the filter member across the exhaust gas outlet port, and a filter member cleaning device which cleans the filter member in a position apart from the exhaust gas outlet port. An exhaust gas cleaner assembly includes a plurality of exhaust gas cleaners as described above, and the exhaust gas inlet ports of the exhaust gas introducing member of the exhaust gas cleaners are provided mutually in series. Another exhaust gas cleaner assembly includes a plurality of exhaust gas cleaners as described above, and the exhaust gas inlet port of the exhaust gas introducing members of the exhaust gas cleaners are provided mutually in parallel.

15 Claims, 2 Drawing Sheets

6,102,991

EXHAUST GAS CLEANER AND EXHAUST GAS CLEANER ASSEMBLY USING A PLURALITY OF EXHAUST GAS CLEANERS

BACKGROUND OF THE INVENTION

The present invention relates to an exhaust gas cleaner for removing harmful matter in an exhaust gas.

Recently, environmental consciousness has been raised and the demand for removing harmful matter contained in an exhaust gas has been increased more and more. Various exhaust gas cleaners having complicated and expensive structures to be used for large scale facilities such as factories and the like have been used practically. However, the appearance of an exhaust gas cleaner having a simple and inexpensive structure which can be used in medium and small scale facilities and movable objects has been expected.

In consideration of the above-mentioned circumstances, it is an object of the present invention to provide an exhaust gas cleaner having a simple and inexpensive structure which can be used in the medium and small scale facilities and the movable objects.

It is another object of the present invention to provide an exhaust gas cleaner assembly using a plurality of such exhaust gas cleaners as described above.

BRIEF SUMMARY OF THE INVENTION

In order to achieve the above-mentioned former object of the present invention, an exhaust gas cleaner according to the present invention comprises an exhaust gas introducing member having an exhaust gas inlet port into which an exhaust gas is introduced and an exhaust gas outlet port through which the exhaust gas is discharged; an endless member provided across the exhaust gas outlet port of the exhaust gas introducing member; a filter member driving device which circulates the filter member across the exhaust gas outlet port; and a filter member cleaning device which cleans the filter member in a position apart from the exhaust gas outlet port.

According to the exhaust gas cleaner according to the present invention, which is characterized by the above-mentioned structure, the exhaust gas is introduced into the exhaust gas introducing member from the exhaust gas inlet port of the exhaust gas introducing member. Then, the exhaust gas is led to the filter member through the exhaust gas outlet port, and passes through the filter member so that harmful matter contained in the exhaust gas is filtered by the filter member. The filter member is circulated at a desired speed by the filter member driving device during the operation of the exhaust gas cleaner so that the exhaust gas outlet port is prevented from being clogged. Furthermore, the filter member is cleaned by the filter member cleaning device in the position apart from the exhaust gas outlet port so that it can be used for a long period of time.

In order to achieve the above-mentioned latter object of the present invention, an exhaust gas cleaner assembly according to the present invention comprises a plurality of exhaust gas cleaners; each of the exhaust gas cleaners, including an exhaust gas introducing member having an exhaust gas inlet port into which an exhaust gas is introduced and an exhaust gas outlet port through which the exhaust gas is discharged, an endless filter member provided across the exhaust gas outlet port of the exhaust gas introducing member, a filter member driving device which circulates the filter member across the exhaust gas outlet port, and a filter member cleaning device which cleans the filter member in a position apart from the exhaust gas outlet port; and the exhaust gas cleaners having the exhaust gas inlet ports of the exhaust gas introducing members provided mutually in series.

In order to achieve the above-mentioned latter object of the present invention, another exhaust gas cleaner assembly according to the present invention comprises a plurality of exhaust gas cleaners; each of the exhaust gas cleaners, including an exhaust gas introducing member having an exhaust gas inlet port into which an exhaust gas is introduced and an exhaust gas outlet port through which the exhaust gas is discharged, an endless filter member provided across the exhaust gas outlet port of the exhaust gas introducing member, a filter member driving device which circulates the filter member across the exhaust gas outlet port, and a filter member cleaning device which cleans the filter member in a position apart from the exhaust gas outlet port; and the exhaust gas cleaners having the exhaust gas inlet ports of the exhaust gas introducing members provided mutually in parallel.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

Figures 1A, 1B:
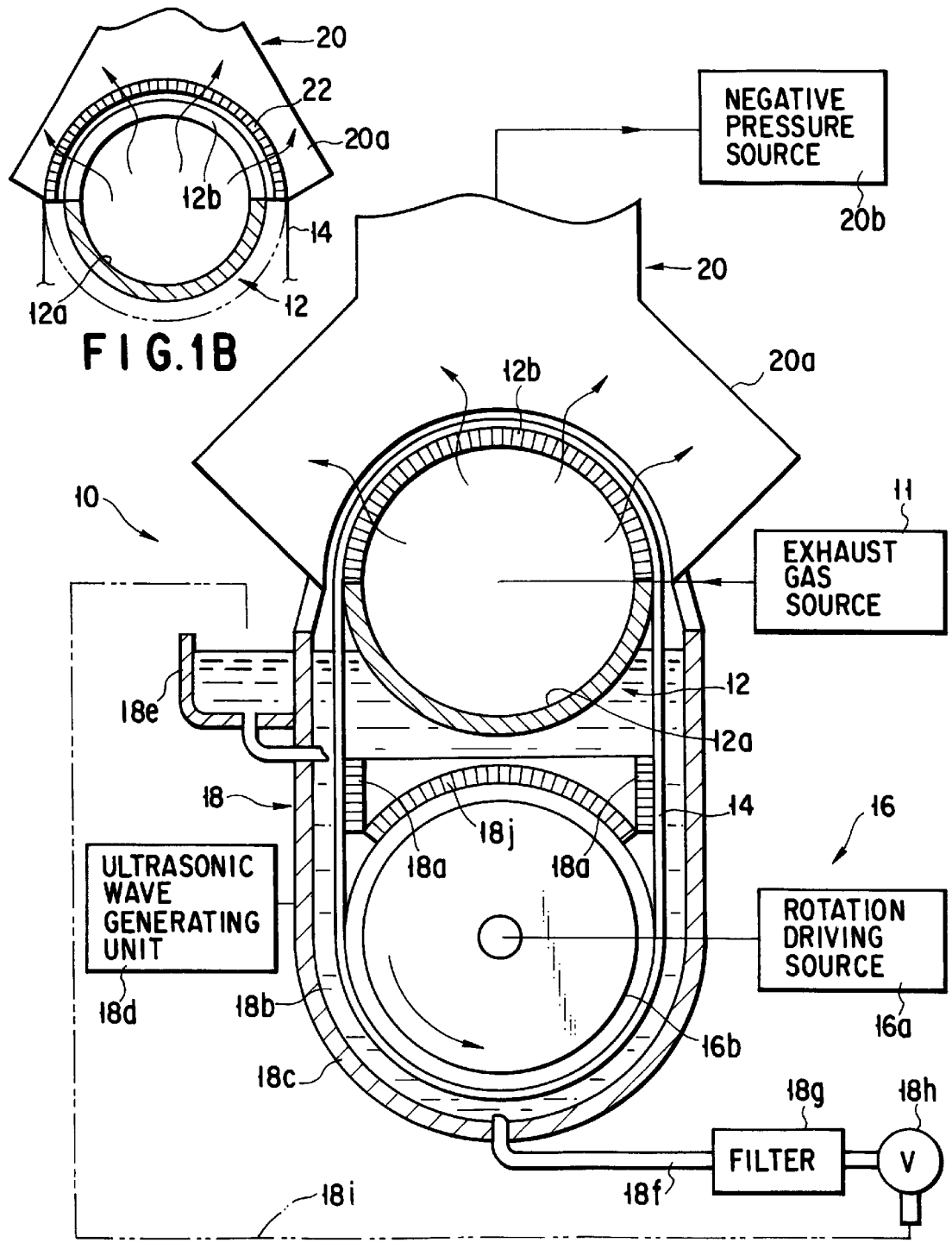
FIG. 1A is a schematically cross sectional view showing an exhaust gas cleaner according to an embodiment of the present invention, wherein the cleaner is combined with an exhaust gas source.
FIG. 1B is a schematically cross sectional view showing a main portion of a modification of the exhaust gas cleaner illustrated in FIG. 1A.

An exhaust gas cleaner according to an embodiment of the present invention, an exhaust gas cleaner assembly using a plurality of exhaust gas cleaners in series, each cleaner according to the embodiment of the present invention, and an exhaust gas cleaner assembly using a plurality of exhaust gas cleaners in parallel, each cleaner according to the embodiment of the present invention, will be described below in detail with reference to the above-mentioned drawings.

DETAILED DESCRIPTION OF THE INVENTION

First of all, an exhaust gas cleaner 10 in accordance with an embodiment of the present invention will be described in detail with reference to FIGS. 1A and 2.

The exhaust gas cleaner 10 comprises an exhaust gas introducing member 12 having an exhaust gas inlet port 12a into which an exhaust gas is introduced from an exhaust gas source 11, and an exhaust gas outlet port 12b through which the exhaust gas is discharged. The exhaust gas source 11 includes a combustion source used in houses, stores, factories and the like, for example, or an engine used in movable objects such as ships, automobiles, railroad vehicles and the like.

An endless filter member 14 is provided across the exhaust gas outlet port 12b of the exhaust gas introducing member 12. The filter member 14 is circulated across the exhaust gas outlet port 12a by means of a filter member driving device 16. The filter member 14 is cleaned by a filter member cleaning device 18 in a position apart from the exhaust gas outlet port 12b.

In the present embodiment, the exhaust gas introducing member 12 has a pipe shape, more preferably, has a cylindrical shape. One of both ends of the exhaust gas introducing member 12 is opened and used as the exhaust gas inlet port 12a connected to the exhaust gas source 11, and the other 12c is closed. The exhaust gas outlet port 12b is constituted by a number of holes formed in a part of a peripheral wall of the exhaust gas introducing member 12, that is, an upper half portion of the peripheral wall in the present embodiment.

The exhaust gas cleaner according to the embodiment of the present invention further comprises an exhaust gas sucking device 20 which faces the exhaust gas outlet port 12b through the filter member 14. The exhaust gas sucking device 20 includes a hood 20a covering the exhaust gas outlet port 12b and a negative pressure source 20b communicating with the outlet opening of the hood 20a. The negative pressure source 20b utilizes a negative pressure generated by itself to suck an exhaust gas contained in the exhaust gas introducing member 12 from the exhaust gas outlet port 12b into the hood 20a through the filter member 14 and to further move the exhaust gas from the inside of the hood 20a to the outside thereof quickly. While the exhaust gas passes through the filter member 14, substances contained in the exhaust gas are captured by the filter member 14.

The filter member driving device 16 includes a rotation driving source 16a such as an electric motor, and a rotation member 16b to be rotated by the rotation driving source 16a. In the present embodiment, the rotation member 16b is arranged below the exhaust gas introducing member 12. The endless filter member 14 is partially wrapped around an outer peripheral surface of the rotation member 16b and a portion of an outer peripheral surface of the peripheral wall of the exhaust gas introducing member 12, the portion corresponding to at least the exhaust gas outlet port 12b. As a result, the rotation member 16b is rotated by the rotation driving source 16 so that the filter member 14 is circulated across the exhaust gas outlet port 12a of the exhaust gas introducing member 12.

While this circulation may always be performed at a predetermined speed during the operation of the exhaust gas cleaner according to the present embodiment, it can be performed intermittently at a predetermined interval during the operation. Furthermore, by measuring fouling on a region of the filter member 14, the region facing the exhaust gas outlet port 12a, with a well-known fouling sensor which is not shown, the circulation can be carried out only when the fouling has become a predetermined value or more.

The filter member cleaning device 18 is arranged in a position apart from the exhaust gas inlet port 12b of the exhaust gas introducing member 12, and includes a contact-type cleaning member 18a which is in contact with the region on a surface of the filter member 14, the region facing the exhaust gas inlet port 12b of the exhaust gas introducing member 12 during the circulation of the filter member 14, and brushes off substances sticking to the region of the filter member 14. In the present embodiment, the contact-type cleaning member 18a is arranged between the exhaust gas introducing member 12 and the rotation member 16b, and is constituted by a brush to come in contact with the outer surface of the filter member 14.

The filter member cleaning device 18 includes a cleaning fluid holding member 18c which holds a cleaning fluid 18b in which the filter member 14 is immersed in the position apart from the exhaust gas inlet port 12b of the exhaust gas introducing member 12. The cleaning fluid 18b is so selected that it can efficiently clean the substances captured in the filter member 14. In order to enhance the efficiency of the cleaning, the filter member cleaning device 18 can further include an ultrasonic wave generating unit 18d which generates ultrasonic waves in the cleaning fluid 18b in the cleaning fluid holding member 18c.

The use of a contact-type cleaning member 18a and the cleaning fluid 18b causes the lifetime of the filter member 14 to be prolonged. Furthermore, by appropriately selecting the kinds of the cleaning fluid 18b and the filter member 14 (that is to say, the material and structure of the filter member 14), it can be set what substance contained in the exhaust gas can be captured by the filter member 14.

The filter member cleaning device 18 can further comprise a cleaning fluid supply device 18e for supplying a fresh cleaning fluid 18b to the cleaning fluid holding member 18c. Furthermore, the filter member cleaning device 18 comprises a cleaning fluid discharge piping 18f for discharging a dirty cleaning fluid 18b from the cleaning fluid holding member 18c, and a filter 18g provided in the cleaning fluid discharge piping 18f for capturing harmful matter contained in the dirty cleaning fluid 18b flowing in the cleaning fluid discharge circuit 18f. The cleaning fluid 18b filtered by the filter 18g is discharged, through a switching valve 18h, to an outside of the exhaust gas cleaner according to the embodiment. However, a part or all of the cleaning fluid 18b discharged from the switching valve 18h can be returned to the cleaning fluid supply device 18e for reuse, by means of a circulation piping 18i.

Furthermore, the filter member cleaning device 18 can use a rotation member cleaning member 18j which is in contact with the outer peripheral surface of the rotation member 16b and polishes the outer peripheral surface to prevent fouling from sticking onto the outer peripheral surface of the rotation member 16b and hence contaminating the filter member 14.

In a modification of the embodiment of the present invention, shown in FIG. 1B, the exhaust gas outlet port 12b formed in a part of the peripheral wall of the exhaust gas introducing member 12 covered with a breathing cover 22 which is provided outward apart from the exhaust gas outlet port 12b and has a breathing characteristic. The filter member 14 is not directly wrapped around the outer peripheral surface of the peripheral wall of the exhaust gas introducing member 12 but is indirectly wrapped therearound through the breathing cover 22. In this case, the breathing cover 22 also functions as a filter member support member. In this modification, the breathing cover 22 can be freely removed from and attached to the peripheral wall of the exhaust gas introducing member 12, so that the formation and maintenance of the exhaust gas outlet port 12b can easily be carried out.

Furthermore, the breathing cover 22 can be formed to a cylindrical shape and is concentrically rotatable with the exhaust gas introducing member 12, as shown in a two-dots chain line in FIG. 1B. Consequently, it is possible to reduce the wear of the filter member 14 itself, the wear of the outer peripheral surface of the peripheral wall of the exhaust gas introducing member 12 or the outer peripheral surface of the breathing cover 22 and the load of the rotation driving source 16a.

Figure 2:
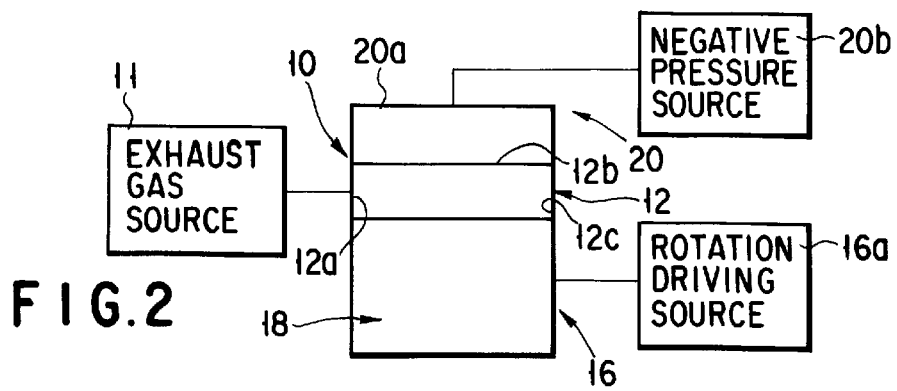
FIG. 2 is a schematic view showing a connection of the exhaust gas cleaner of FIG. 1A to the exhaust gas source.
Figure 3A:
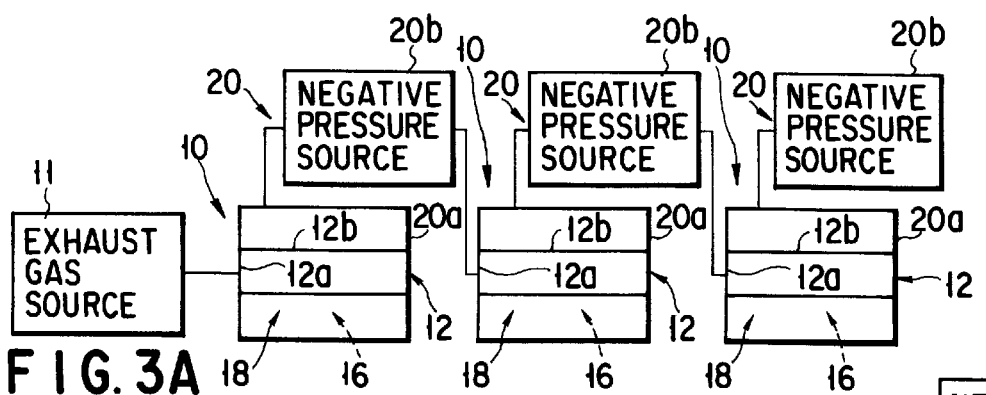
FIG. 3A is a schematic view showing a first series connection of an exhaust gas cleaner assembly using a plurality of exhaust gas cleaners to the exhaust gas source, each cleaner according to the embodiment of the present invention.
Figure 3B:
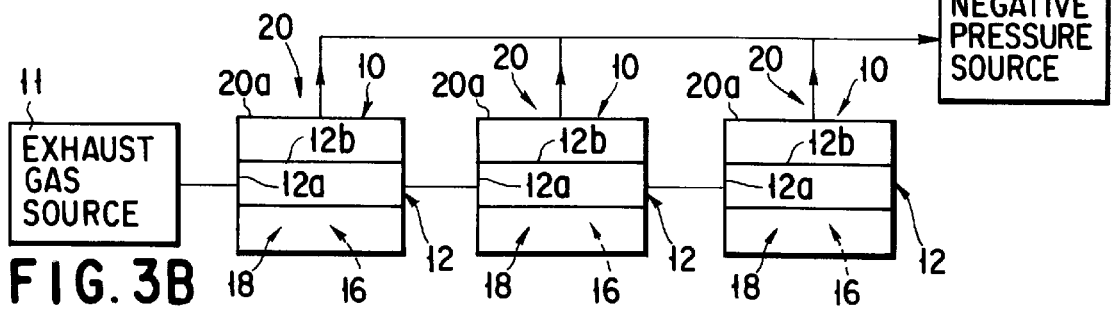
FIG. 3B is a schematic view showing a second series connection of the exhaust gas cleaner assembly using a plurality of exhaust gas cleaners to the exhaust gas source, each cleaner according to the embodiment of the present invention.
Figure 4:
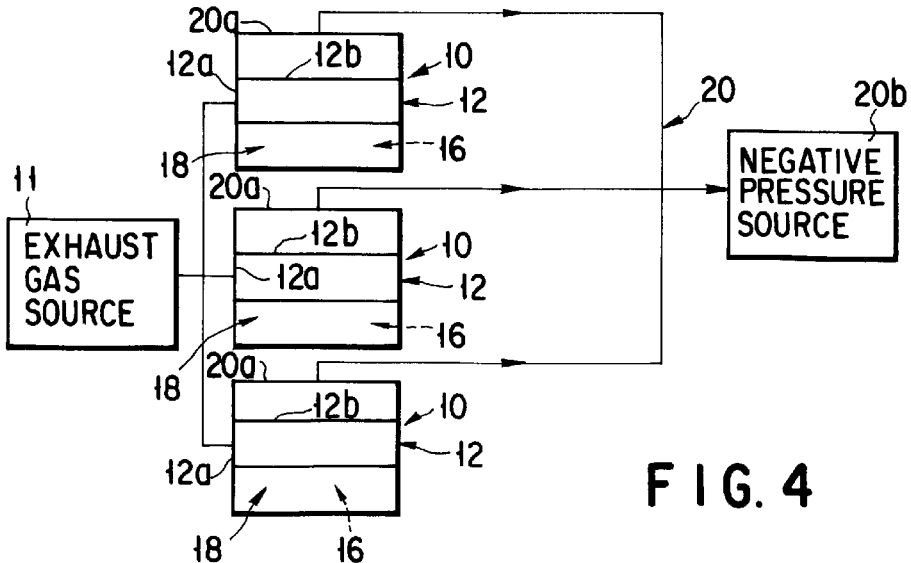
FIG. 4 is a schematic view showing a parallel connection of the exhaust gas cleaner assembly using a plurality of exhaust gas cleaners to the exhaust gas source, each cleaner according to the embodiment of the present invention.

While the exhaust gas cleaner 10 according to the embodiment of the present invention and having the above-mentioned structure or the modification thereof can be used for one exhaust gas source 11, as shown in FIG. 2, a plurality of exhaust gas cleaners 10 can be used in series for one exhaust gas source 11, as shown in FIGS. 3A and 3B, or can be used in parallel for the exhaust gas source 11, as shown in FIG. 4.

In a first series arrangement shown in FIG. 3A, the exhaust gas inlet port 12a of one of the both ends of the exhaust gas introducing member 12 of the exhaust gas cleaner 10, the cleaner 10 being closest to the exhaust gas source 11, is coupled to the exhaust gas source 11, and the exhaust gas inlet port 12a provided on one of the both ends of the exhaust gas introducing member 12 of each of the exhaust gas cleaners 10, these cleaners 10 being the second closest and followed therefrom, is connected to the negative pressure source 20b of the exhaust gas outlet port 12b of the exhaust gas cleaner 10 arranged prior thereto. However, the negative pressure sources 20b other than the negative pressure source 20b of the exhaust gas outlet port 12b of the last exhaust gas cleaner 10 are omitted, and the exhaust gas outlet ports 12b provided on the exhaust gas cleaners 10 which are from the closet to the exhaust gas source 11 up to the second from the last can be connector directly to the exhaust gas inlet port 12a of the next exhaust gas cleaner 10.

In a second series arrangement shown in FIG. 3B, the opening formed on the other end of the exhaust gas introducing member 12 of each of the exhaust gas cleaners 10 arranged adjacently to each other is connected to the exhaust gas inlet port 12a formed in one of the ends thereof, excepting that the exhaust gas inlet port 12a formed in one of both ends of the exhaust gas introducing member 12 of the exhaust gas cleaner 10 which is the closest to the exhaust gas source 11 is connected to the exhaust gas source 11 and the other of the both ends of the exhaust gas introducing member 12 of the exhaust gas cleaner 10 which is the farthest from the exhaust gas source 11 is blocked. In this case, the hoods 20a of the exhaust gas sucking devices 20 of the exhaust gas cleaners 10 can be connected to the common negative pressure source 20b, as shown in FIG. 3B, and the negative pressure source 20b can be connected to each of the hoods 20a of the exhaust gas sucking devices 20 of the exhaust gas cleaners 10 as described above with reference to FIGS. 1A and 2. Furthermore, the exhaust gas cleaners 10 may be divided into some groups and one negative pressure source 20b can be adapted to each group.

In the series arrangement shown in FIGS. 3A and 3B, the same kind of matter or substance can be removed from the exhaust gas in each of the exhaust gas cleaners, and different kinds of matters or substances can be removed from the exhaust gas respectively in the exhaust gas cleaners 10. Furthermore, some kinds of matters or substances contained in the exhaust gas can be removed in some of the exhaust gas cleaners 10, and a specific matter or substance contained in the exhaust gas can be removed by the specific one of the exhaust gas cleaners 10.

In a parallel arrangement shown in FIG. 4, the exhaust gas inlet ports 12a of the exhaust gas introducing members 12 of the exhaust gas cleaners 10 are connected to the exhaust gas source 11 in parallel with each other. The hoods 20a of the exhaust gas sucking devices 20 of the exhaust gas introducing members 12 of the exhaust gas cleaners 10 can be connected to the common negative pressure source 20b as shown in FIG. 4, and the negative pressure source 20b can be connected to each of the hoods 20a of the exhaust gas sucking devices 20 of the exhaust gas cleaners 10 as described above with reference to FIGS. 1A and 2. Furthermore, the exhaust gas cleaners 10 may be divided into some groups and one negative pressure source 20b can be adapted to each group.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An exhaust gas cleaner comprising:
    an exhaust gas introducing member having an exhaust gas inlet port into which an exhaust gas is introduced and an exhaust gas outlet port through which the exhaust gas is discharged;
    an endless filter member provided across the exhaust gas outlet port of the exhaust gas introducing member;
    a filter member driving device which circulates the filter member across the exhaust gas outlet port; and
    a filter member cleaning device which cleans the filter member in a position apart from the exhaust gas outlet port.

2. An exhaust gas cleaner according to claim 1, wherein the exhaust gas introducing member has a cylindrical shape having a peripheral wall in which the exhaust gas outlet port is formed, and at least one of both ends of the exhaust gas introducing member opens and functions as the exhaust gas inlet port.

3. An exhaust gas cleaner according to claim 2, wherein the other of the both ends of the cylindrical exhaust gas introducing member is closed.

4. An exhaust gas cleaner according to claim 1, further comprising an exhaust gas sucking device which faces the exhaust gas outlet port through the filter member and forcibly sucks the exhaust gas from an inside of the exhaust gas introducing member through the exhaust gas outlet port.

5. An exhaust gas cleaner according to claim 2, wherein the filter member driving device includes a rotation driving source and a rotation member which is rotated by the rotation driving source, and the filter member is partially wrapped around a portion of an outer peripheral surface of the peripheral wall of the cylindrical exhaust gas introducing member, the portion corresponding to at least the exhaust gas outlet port, and an outer peripheral surface of the rotation member of the filter member driving device.

6. An exhaust gas cleaner according to claim 2, wherein the filter member driving device includes a rotation driving source, a rotation member which is rotated by the rotation driving source, and a filter member support member which has a breathing characteristic and faces a portion corresponding to at least the exhaust gas outlet port on an outer peripheral surface of the peripheral wall of the cylindrical exhaust gas introducing member, and the filter member is partially wrapped around the rotation member of the filter member driving device and the filter member support member.

7. An exhaust gas cleaner according to claim 1, wherein the filter member cleaning device includes a contact cleaning member which is in contact with a region on a surface of the filter member in a position part from the exhaust gas outlet port, the region facing the exhaust gas inlet port of the exhaust gas introducing member during the circulation of the filter member.

8. An exhaust gas cleaner according to claim 1, wherein the filter member cleaning device includes a cleaning fluid holding member which holds a cleaning fluid in which the filter member is immersed, and is arranged in a position apart from the exhaust gas outlet port.

9. An exhaust gas cleaner according to claim 8, wherein the filter member cleaning device includes a cleaning fluid supply device which supplies the cleaning fluid to the cleaning fluid holding member.

10. An exhaust gas cleaner according to claim 8, wherein the filter member cleaning device includes a cleaning fluid discharge piping which discharges the cleaning fluid from the cleaning fluid holding member, and a filter which is provided in the cleaning fluid discharge piping which captures harmful matter in the cleaning fluid flowing in the cleaning fluid discharge piping.

11. An exhaust gas cleaner according to claim 8, wherein the filter member cleaning device includes a contact cleaning member which is contact with a region on a surface of the filter member, the region facing the exhaust gas inlet port of the exhaust gas introducing member during the circulation of the filter member, and brushes off substances sticking to the region on the surface into the cleaning fluid in the cleaning fluid holding member.

12. An exhaust gas cleaner according to claim 11, wherein the filter member cleaning device includes a cleaning fluid supply device which supplies the cleaning fluid to the cleaning fluid holding member.

13. An exhaust gas cleaner according to claim 11, wherein the filter member cleaning device includes a cleaning fluid discharge piping which discharges the cleaning fluid from the cleaning fluid holding member, and a filter which is provided in the cleaning fluid discharge piping and captures harmful matter contained in the cleaning fluid flowing in the cleaning fluid discharge piping.

14. An exhaust gas cleaner assembly comprising
a plurality of exhaust gas cleaners;
each of the exhaust gas cleaners, including an exhaust gas introducing member having an exhaust gas inlet port into which an exhaust gas is introduced and an exhaust gas outlet port through which the exhaust gas is discharged, an endless filter member provided across the exhaust gas outlet port of the exhaust gas introducing member, a filter member driving device which circulates the filter member across the exhaust gas outlet port, and a filter member cleaning device which cleans the filter member in a position apart from the exhaust gas outlet port; and
the exhaust gas cleaners having the exhaust gas inlet ports of the exhaust gas introducing members provided mutually in series.

15. An exhaust gas cleaner assembly comprising
a plurality of exhaust gas cleaners;
each of the exhaust gas cleaners, including an exhaust gas introducing member having an exhaust gas inlet port into which an exhaust gas is introduced and an exhaust gas outlet port through which the exhaust gas is discharged, an endless filter member provided across the exhaust gas outlet port of the exhaust gas introducing member, a filter member driving device which circulates the filter member across the exhaust gas outlet port, and a filter member cleaning device which cleans the filter member in a position apart from the exhaust gas outlet port; and
the exhaust gas cleaners having the exhaust gas inlet ports of the exhaust gas introducing members provided mutually in parallel.

\* \* \* \* \*